3,803,232
ARYLCARBOXAMIDINES

Herman Robert Rodriguez, New York, N.Y., and Herbert Morton Blatter, Summit, N.J., assignors to Ciba-Geigy Corporation, Ardsley, N.Y.
No Drawing. Filed Sept. 30, 1970, Ser. No. 77,001
Int. Cl. C07c *123/00*
U.S. Cl. 260—564 R                5 Claims

ABSTRACT OF THE DISCLOSURE

N-Arylcycloalkyl-arylcarboxamidines, e.g. those of the formula

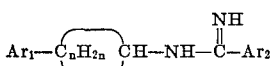

$Ar_{1,2}$=isocyclic aryl
$n$=4–7 and salts thereof exhibit diuretic effects.

SUMMARY OF THE INVENTION

The present invention concerns and has for its object the provision of new N - arylcycloalkyl-arylcarboxamidines, more particularly of those corresponding to Formula I

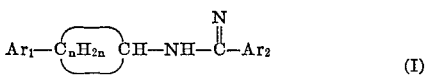

(I)

in which each of $Ar_1$ and $Ar_2$ is a monocyclic isocyclic aromatic radical and $n$ is an integer from 4 to 7, or salts thereof, and methods for the preparation of said compounds; as well as corresponding pharmaceutical compositions, their preparation and use. The compounds of the invention possess diuretic acivity and are useful for this purpose.

DESCRIPTION OF THE PREFERRED EMBODIMENTS

A monocyclic isocyclic aromatic radical $Ar_1$ or $Ar_2$ is phenyl or phenyl substituted by one or more than one, of the same or different substituents attached to any of the positions available for substitution. A substituted aromatic radical $Ar_1$ contains preferably up to two substituents, whereas $Ar_2$ preferably contains only one substituent. Such substituents are, for example, lower alkyl, e.g. methyl, ethyl, n- or i-propyl or -butyl, free or etherified hydroxy or mercapto, such as lower alkoxy, alkylenedioxy or alkylmercapto, e.g. methoxy, ethoxy, n- or i-propoxy or -butoxy, methylenedioxy, 1,1- or 1,2-ethylenedioxy, methyl- or ethylmercapto; halo or halo-lower alkyl, e.g. fluoro, chloro, bromo or trifluoromethyl; nitro; amino; di-lower alkylamino or lower alkanoylamino, e.g. dimethylamino or diethylamino; acetylamino or propionylamino. The term "lower," referred to above and hereinafter in connection with organic radicals or compounds respectively, defines such with up to 7, preferably up to 4, carbon atoms.

Preferred radicals $Ar_1$ stand for phenyl, mono or di-substituted (lower alkyl)$_{1-2}$-phenyl, (lower alkoxy)-phenyl mono- or disubstituted, (lower alkylenedioxy)-phenyl, (lower alkylmercapto)-phenyl, mono- or disubstituted (halo)-phenyl, (trifluoromethyl)-phenyl, (nitro)-phenyl, (amino)-phenyl, (di-lower alkylamino)-phenyl or (lower alkanoylamino)-phenyl. Preferred radicals $Ar_2$ stand for phenyl, (lower alkyl)-phenyl, (lower alkoxy)-phenyl, (halo)-phenyl or (trifluoromethyl)-phenyl.

The compounds of the invention exhibit valuable pharmacological properties. For example, they show primarily diuretic activity, as can be demonstrated in animal tests, using preferably mammals, for example, rats as test animals. The compounds of the invention can be administered enterally or parenterally, for example, in the form of aqueous solutions or suspensions by stomach tube to rats at a dosage between about 0.1 to 50 mg./kg./day, preferably between about 1 and 25 mg./kg./day, advantageously between about 3 and 12.5 mg./kg./day. Simultaneously, the test animals may receive various salt loads enterally or parenterally, for example, various amounts of subcutaneously applied 0.9% saline. Subsequent to administration, the urine of the treated rats is collected at 2 hour intervals, with or without catheterization, and its volume, sodium, potassium and chloride content estimated and compared with that of the same untreated or saline-treated rats. Thus, for example, administration of trans-N-[2-(3,4 - dimethoxyphenyl)cyclohexyl]-4-methylbenzamidine hydrochloride, a characteristic compound of the present invention, at the dosage range between 3 and 12.5 mg./kg./day to rats caused a marked increase in urine excretion, sodium excretion and low level increase in potassium excretion. Accordingly, the compounds of the invention are potent diuretics, sodi- and chloriuretics, primarily useful in the treatment or management of edematous water and salt retention. They can also be used as intermediates in the preparation of other valuable products, primarily of pharmacologically active compounds.

Particularly useful are compounds of the Formula I, in which $Ar_1$ is phenyl mono- or disubstituted (lower alkyl)-phenyl mono- or disubstituted, (lower alkoxy)-phenyl, (lower alkylenedioxy)-phenyl, (lower alkylmercapto)-phenyl, mono- or disubstituted (halo)$_{1-2}$-phenyl, (trifluoromethyl)-phenyl, (nitro)-phenyl, (amino)-phenyl, (di-lower alkylamino)-phenyl or (lower alkanoylamino)-phenyl, $Ar_2$ is phenyl, (lower alkyl)-phenyl, (lower alkoxy)-phenyl, (halo)-phenyl or (trifluoromethyl)-phenyl, and $n$ is an integer from 4 to 7, or salts of pharmaceutically acceptable acids thereof.

Preferred compounds are those of Formula I, in which $Ar_1$ is phenyl, (lower alkyl)-phenyl, mono- or disubstituted (lower alkoxy)-phenyl, (halo)-phenyl, (trifluoromethyl)-phenyl, (nitro)-phenyl, (amino)-phenyl, (di-lower alkylamino)-phenyl or (lower alkanoylamino)-phenyl, $Ar_2$ is phenyl, (lower alkyl)-phenyl or (halo)-phenyl and $n$ is 4 to 6, or salts of pharmaceutically acceptable acids thereof.

Compounds that are especially valuable are those of Formula II

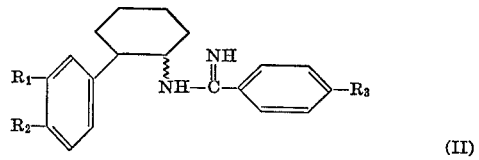

(II)

in which each of $R_1$ and $R_2$ is hydrogen, methyl, ethyl, methoxy, ethoxy, chloro, nitro or amino, and $R_3$ is hydrogen, methyl or chloro, or salts of pharmaceutically acceptable acids thereof, or, above all, the cis- or especially the trans-N-[2-(3,4-dimethoxyphenyl)-cyclohexyl]-4-methylbenzamidine, or salts of pharmaceutically acceptable acids thereof.

The compounds of the invention are prepared according to methods in themselves known, for example, the corresponding process comprises:

(a) condensing compounds of the formulae

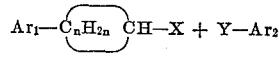

in which X stands for amino and Y for a reactively converted, nitrogen containing carboxyl group or X for reactively esterified or etherified hydroxy or mercapto and Y for the amidino group, or (b) reacting a compound of the formula

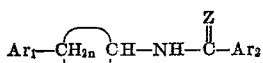

in which Z stands for oxo or thio, or a reactive functional derivative thereof, with ammonia and, if desired, converting any resulting compound into another compound of the invention.

A reactively esterified hydroxy group is, for example, such derived from hydrohalic or sulfonic acids, e.g. hydrochloric, hydrobromic, hydroiodic, methane-, ethane- or p-toluenesulfonic acid, whereas a corresponding etherified hydroxy or mercapto group preferably is such, derived from lower alkanols or cyanoalkanols. A reactive functional derivative of the carboxylic acid mentioned under item (a) is, for example, its imido ester, imido thioester, unsubstituted amidine or nitrile, and that mentioned under item (b) is preferably the corresponding imide-halide.

Any compound so obtained, containing in the aromatic portion a substituent convertible into such specifically mentioned above, e.g. an azo group, such group can be converted into amino, for example by hydrogenation, advantageously in an acidic medium. Also, the compounds of the invention can be converted into each other by known methods. Thus, for example, resulting compounds containing free hydroxy, mercapto or amino groups, can be etherified, esterified or N-substituted, for example with the use of reactive esters of corresponding alcohols derived, for example, from the acids mentioned above, or with reactive functional acid derivatives, e.g. the halides or anhydrides. Resulting nitro compounds can be reduced as shown for the azo compounds and acylamino compounds hydrolyzed.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tafrtaric, citric, ascorbic, maleic, hydroxymaleic, pyroracemic, phenylacetic, benzoic, aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halobenzenesulfonic, toluenesulfonic, naphthalenesulfonic, sulfanilic or cyclohexylsulfamic acid; methionine, tryptophan, lysine or arginine.

These or other salts, for example, the picrates, can also be used for the purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, amines, alcohols or phenols can be used in the form of the alkali or alkaline earth metal salts, e.g. sodium, potassium, magnesium, halomagnesium or calcium salts, and the nitrogen containing acid derivatives, e.g. imidic acid esters, in the form of their acid addition salts. Mainly, those starting materials should be used in the above reactions that lead to the formation of those compounds indicated as being specially valuable.

The starting material used is known or, if new, can be prepared according to known methods, e.g. the classical amination or amidation reactions, described, for example, by R. B. Wagner and H. D. Zook in "Synthetic Organic Chemistry," John Wiley & Sons, Inc., New York, 1956, e.g. by reducing oximes of corresponding 2-Ar$_1$-cycloalkanones or by Curtius-degradation of 2-Ar$_1$-cycloalkanecarboxylic acid azides. The nitro-precursors of said amines can also be obtained by Diels-Alder reaction of β-nitrostyrenes with butadienes, as described in J. Org. Chem. 8, 377 (1943). In addition, starting materials can be prepared directly as a single geometric isomer; for example, trans-Ar$_1$-cycloalkylamines are obtained according to the method described in J. Am. Chem. Soc., 88, 2870 (1966), i.e. by adding organoboranes to 1-Ar$_1$-cycloalkenes and reacting the adducts with chloramine or preferably hydroxylamino-O-sulfonic acid.

Starting materials or final products that are mixtures of isomers can be separated into single isomers by methods in themselves known. For example, the cis- and trans-Ar$_1$-cycloalkylamine starting materials are obtained and separated into single isomers thereof essentially as described in J. Am. Chem. Soc., 82, 4696 (1960). Resulting compounds that contain one or more asymmetrical carbon atoms may be in the form of racemate mixtures, pure racemates or optical antipodes. Mixtures of racemates, by virtue of the physiocochemical differences between the components, can be resolved into pure racemates, for example, by chromatography and/or fractional crystallization. Racemic products can likewise be resolved into the optical antipodes, for example, by reaction with optically active acids, separation of the diastereoisomeric salts and liberation of the bases from the salts.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tagacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredient.

Example 1

The mixture of 15 g. of trans-2-(3,4-dimethoxyphenyl)-cyclohexylamine, 8.4 g. of 4-methylbenzamidine and 750 ml. of xylene is refluxed for 40 hours and evaporated under reduced pressure. The residue is taken up in toluene and the solution acidified with anhydrous hydrogen chloride. The solids formed are collected on a filter and taken up in methanol. The solution is treated with charcoal, filtered and the filtrate evaporated under reduced pressure. Trituration of the residue with diethyl ether affords the trans-N-[2-(3,4-dimethoxyphenyl)-cyclohexyl] - 4 - methylbenzamidine hydrochloride of the formula

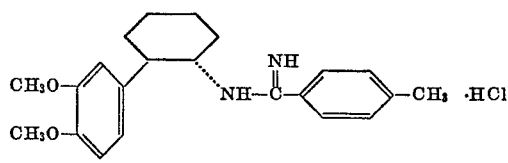

melting at 145–150°.

In an analogous manner, the cis-N-[2-(3,4-dimethoxyphenyl)-cyclohexyl] - 4 - methylbenzamidine is obtained from the corresponding cis-2-(3,4-dimethoxyphenyl)-cyclohexylamine.

Example 2

Preparation of 10,000 tablets each containing 50.0 mg. of the active ingredient:

| Formula: | G. |
|---|---|
| Trans-N-[2-(3,4 - dimethoxyphenyl)-cyclohexyl] - 4 - methylbenzamidine hydrochloride | 500.00 |
| Lactose | 1,706.00 |
| Corn starch | 90.00 |
| Polyethylene glycol 6,000 | 90.00 |
| Talcum powder | 90.00 |
| Magnesium stearate | 24.00 |
| Purified water q.s. | |

Procedure: All the powders are passed through a screen with an opening of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

We claim:
1. An N - arylcycloalkyl - arylcarboxamidine of the formula

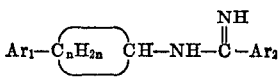

in which $Ar_1$ is phenyl, mono- or disubstituted (lower alkyl) phenyl, mono- or disubstituted (lower alkoxy)-phenyl, (lower alkylenedioxy)-phenyl, (lower alkylmercapto)-phenyl, mono- or disubstituted (halo)-phenyl, (trifluoromethyl)-phenyl, (nitro)-phenyl, (amino) - phenyl, (di-lower alkylamino)-phenyl or (lower alkanoylamino)-phenyl, $Ar_2$ is phenyl, (lower alkyl)-phenyl, (lower alkoxy)-phenyl, (halo)-phenyl or (trifluoromethyl)-phenyl and $n$ is an integer from 4 to 7, or a salt thereof of a pharmaceutically acceptable acid.

2. A compound as claimed in claim 1, in which formula $Ar_1$ is phenyl, (lower alkyl)-phenyl, mono- or disubstituted (lower alkoxy)-phenyl, (halo)-phenyl, (trifluoromethyl)-phenyl, (nitro) - phenyl, (amino)-phenyl, (di-lower alkylamino)-phenyl or (lower alkanoylamino)-phenyl, $Ar_2$ is phenyl, (lower alkyl)-phenyl or (halo)-phenyl and $n$ is 4 to 6, or a salt thereof of a pharmaceutically acceptable acid.

3. A compound as claimed in claim 1 and having the formula

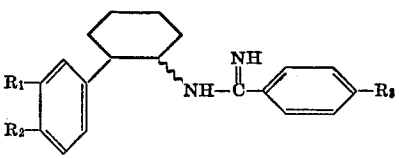

in which each of $R_1$ and $R_2$ is hydrogen, methyl, ethyl, methoxy, ethoxy, chloro, nitro or amino and $R_3$ is hydrogen, methyl or chloro, or a salt thereof of a pharmaceutically acceptable acid.

4. A compound as claimed in claim 3 and being the cis-N-[2-(3,4-dimethoxyphenyl)-cyclohexyl] - 4 - methylbenzamidine or a salt thereof of pharmaceutically acceptable acid.

5. A compound as claimed in claim 3 and being the trans-N-[2-(3,4-dimethoxyphenyl)-cyclohexyl] - 4 - methylbenzamidine or a salt thereof of a pharmaceutically acceptable acid.

References Cited
UNITED STATES PATENTS 3,282,953   11/1966   Hirt et al.   260—564 X LEON ZITVER, Primary Examiner G. A. SCHWARTZ, Assistant Examiner U.S. Cl. X.R.

260—295.5 S, 340.3, 340.5, 343.7, 397.6, 501.11, 501.12, 501.14, 562 R; 424—326